United States Patent

Gellert

[11] 4,238,671
[45] Dec. 9, 1980

[54] SPRUE BUSHING WITH CAST IN HEATER ELEMENT

[76] Inventor: Jobst U. Gellert, 233 Armstrong Ave., Georgetown, Ontario, Canada, L7G 4S1

[21] Appl. No.: 36,880

[22] Filed: May 8, 1979

Related U.S. Application Data

[63] Continuation-in-part of Ser. No. 970,385, Dec. 18, 1978, abandoned.

[51] Int. Cl.$^2$ .............................................. F27B 14/06
[52] U.S. Cl. .................... 219/421; 219/424; 219/530; 219/544; 222/146 HE; 425/144
[58] Field of Search ............... 219/491, 420, 421, 424, 219/523, 530, 535, 540, 541, 544, 426, 427; 425/143, 144, 145, 243, 247; 222/146 HE

[56] References Cited

U.S. PATENT DOCUMENTS

| | | | |
|---|---|---|---|
| 2,769,201 | 11/1956 | Loronian | 425/144 X |
| 2,814,070 | 11/1957 | Bulkley et al. | 425/144 |
| 3,062,940 | 11/1962 | Bauer et al. | 219/544 |
| 3,304,408 | 2/1967 | Finch et al. | 219/544 |
| 3,849,630 | 11/1974 | Halliday | 219/535 |
| 3,911,251 | 10/1975 | Day | 219/523 |
| 4,032,046 | 6/1977 | Elliott et al. | 222/146 HE |

*Primary Examiner*—Volodymyr Y. Mayewsky
*Attorney, Agent, or Firm*—George H. Riches and Associates

[57] ABSTRACT

This invention relates to an improved electrically heated sprue bushing for injection molding. The sprue bushing has a central runner passage for conveying melt from the molding machine or manifold to the cavity. The runner passage extends through an elongated inner core portion having an undulating outer surface in the form of a helical ridge with a rounded cross section. A single element electrical heating element with a helical configuration is located over the core portion and an outer shell portion is cast over them to form the sprue bushing as an integral unit. The inner core portion is formed of a high strength material such as a beryllium nickel alloy and the outer shell portion is formed of a highly conductive material such as a beryllium copper alloy. The coils of the heating element are separated from each other and threaded in the opposite direction to the helical ridge on the outer surface of the core portion. This allows the highly conductive material to surround the heating element with no insulative air gaps. Thus heat is rapidly conducted away from the heating element preventing burn out, and the undulating surface provides a maximum of surface contact for heat transfer to the core portion. The integral structure provides increased strength to withstand the repeated impact loading which allows the wall thickness of the inner portion to be reduced.

7 Claims, 5 Drawing Figures

SPRUE BUSHING WITH CAST IN HEATER ELEMENT

BACKGROUND OF THE INVENTION

This invention is a continuation-in-part of application Ser. No. 970,385 filed Dec. 18, 1978, now abandoned.

This invention relates to runnerless injection molding and more particularly to an improved electrically heated sprue bushing.

In the past, cold sprue bushings have been widely used to convey the melt from the molding machine to the mold, but these have the disadvantage that they form products having an extending sprue which then must be clipped. Furthermore, a larger melt or runner passage must be provided in order to minimize the problem of stuck sprues and this requires a longer time for the sprue to cool, which in turn limits reductions in cycle time.

More recently, heated sprue bushings have been provided in attempts to overcome these problems. One type of heated sprue bushing has the melt flowing around a central "torpedo" heater element. This arrangement retains many of the disadvantages of cold sprue bushings, and in addition, creates an undue pressure drop through the bushing. Futhermore, the temperature of the melt is uneven and excessive temperatures must be provided at the central "torpedo" element in order to ensure the bushing remains operational.

Even more recently, sprue bushings have been developed with a helical electric heating element surrounding a sleeve which defines the central melt or runner passage. This, in turn, is surrounded by an outer elongated sleeve or member. While providing some advantages over the prior art, this structure still has several disadvantages. In order to withstand instantaneous injection pressures which may exceed 40,000 psi., these bushings have been formed of high strength materials such as H13 steel or stainless steel. Furthermore, the inner sleeve or member must have a minimum wall thickness sufficient to withstand these repeated forces. The heating element is located in an air gap between the two sleeves and the air around the coils of the element acts as an insulator. This fact, combined with the thickness of steel required to provide the inner member with sufficient strength, requires that the heating element be maintained at higher temperatures to provide sufficient heat to the melt. This failure to quickly transfer heat away from the heating element results in it burning out, thus limiting the effective life of the bushing.

SUMMARY OF THE INVENTION

Accordingly, it is an object of the present invention to at least partially overcome these disadvantages by providing a sprue bushing of the type with a helical heating element having improved heat conductivity and strength characteristics.

To this end, in one of its aspects, the invention provides an integral electrically heated sprue bushing comprising: an elongated inner core portion defining a central runner passage extending therethrough, the core portion being formed of a high strength material and having an undulating outer surface, a helical heating element having a plurality of spaced coils encircling the inner core portion, and an elongated outer shell portion cast on the inner core portion and the heating element to be in conductive contact with them along their lengths, the outer shell portion being formed of a material having a high conductivity.

Further objects and advantages of the invention will appear from the following description taken together with the accompanying drawings:

DESCRIPTION OF THE PREFERRED EMBODIMENTS

Figure 1:
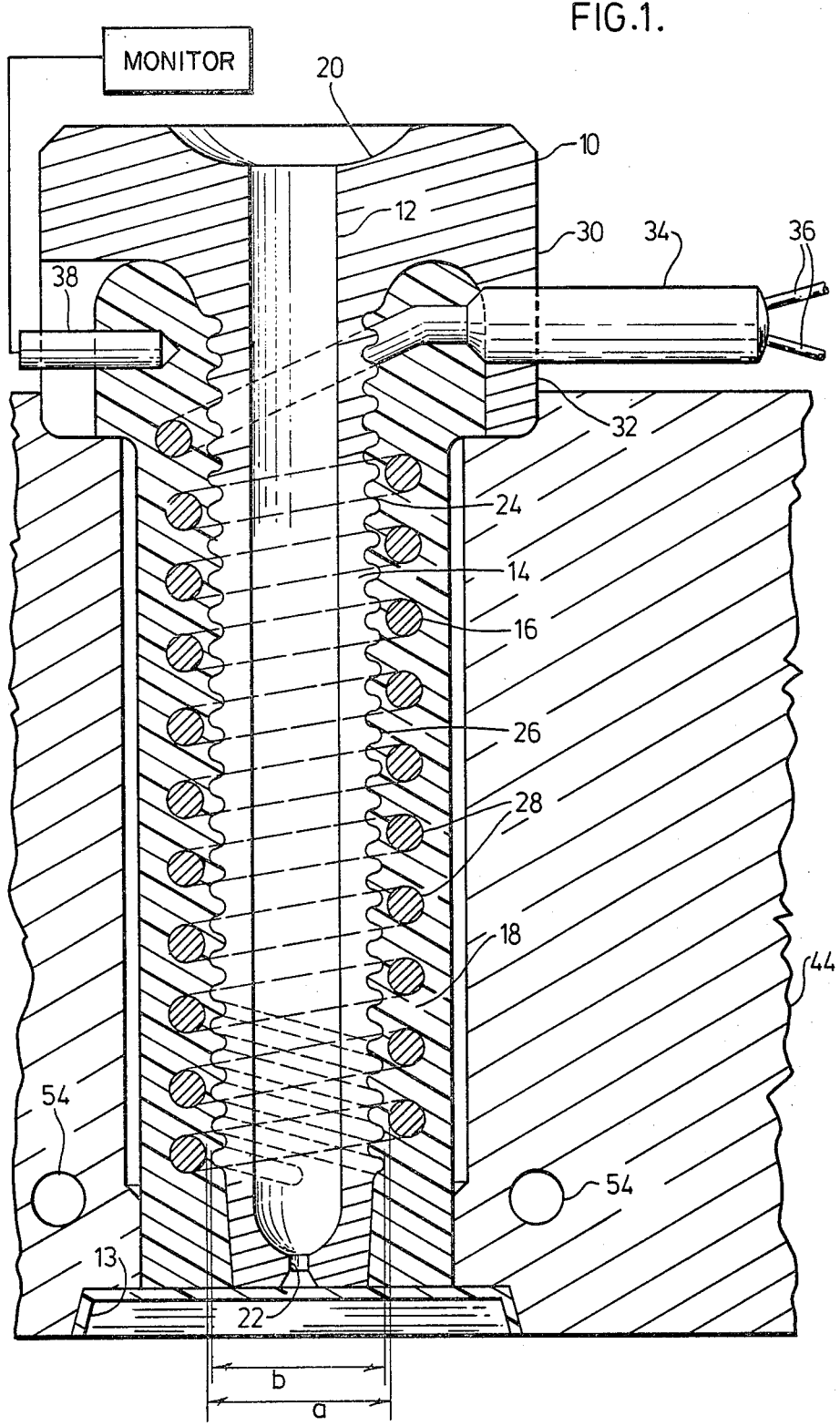
FIG. 1 is a sectional view of a sprue bushing according to a first embodiment of the invention.

Reference is first made to FIG. 1 which shows a sprue bushing 10 which has a central runner passage 12 for conveying melt from the injection machine nozzle to the cavity 13. The sprue bushing 10 has an inner core portion 14, a helical heating element 16, and an outer shell portion 18. The inner core portion 14 defines the runner passage 12, which has a recessed inlet 20 for receiving the molding machine nozzle and a restricted orifice portion 22 leading to the cavity 13. The outer surface 24 of the core portion 14 is shaped to form a helical ridge 26 with a uniform curved cross section. Thus, in cross section, the outer surface 24 undulates in a regular pattern without forming any sharp corners or peaks.

The electrical heating element 16 is of the single element type having quite a number of coils 28 forming a helical shape. The heating element 16 is located over the inner core portion 14 and is stretched so that it covers most of the length of the inner core portion 14 and also so that each coil 28 of the heating element is separated from the adjacent coils. The inner core portion 14 of the sprue bushing 10 has an inlet shoulder portion 30 with a depending lip 32, and the heating element 16 has a connector portion 34 extending through a hole in the lip 32 to which the lead wires 36 are attached. A slot is provided through the lip 32 for the insertion of a thermocouple 38 to monitor the temperature of the sprue bushing. While the inner helical diameter 'a' of the heating element 16 is sufficient to just barely fit over the surface 24 of the core portion 14 with a maximum outer diameter 'b', the helical heating element is threaded in one direction and the helical ridge 26 on the outer surface 24 of the inner core portion 14 is threaded in the opposite direction, so that any contact between them will be only at the points where they intersect.

With the heating element 16 in position around the inner core portion 14, the outer shell portion 18 is cast over them to provide a generally cylindrical shape although it may be slightly sloped to facilitate casting. The inner core portion 14 is formed of a high strength corrosion resistant thermally conductive material, in this embodiment a beryllium nickel alloy having approximately 2% beryllium, ½% chrome, and the remainder essentially nickel. The outer shell portion 18, on the other hand, is formed of a highly conductive material, in this embodiment a beryllium copper alloy having approximately 1% beryllium, 4% cobalt, and the remainder essentially copper. When the material of the outer shell portion 18 is cast over the heating element 16 and the inner core portion 14, it flows between the separated coils 28 of the heating element 16 and bonds to the surfaces of both of them. Due to the separation of the coils 28 and the heating element 16 and the helical ridge 26 being threaded in opposite direction, the beryllium copper surrounds the coils of the heating element, leaving few, if any, insulative voids or air pockets. Thus, heat is quickly conducted away from the heating element by the highly conductive material of the outer shell portion 18. Furthermore, the ridged shape of the surface 24 of the inner core portion 14 provides a maximum of surface contact between it and the outer shell portion 18, thus increasing the efficiency of heat transfer to maintain the melt in the runner passage 12 at a more constant temperature. Also, the integral structure of the sprue bushing and the encircling ridge 26 and heating element structure provide increased strength to withstand the repeated high pressure loading, thus allowing the wall thickness of the inner core portion 14 to be reduced which, in turn, again increases the heat conductivity from the heating element 16 to the melt.

Figure 3:
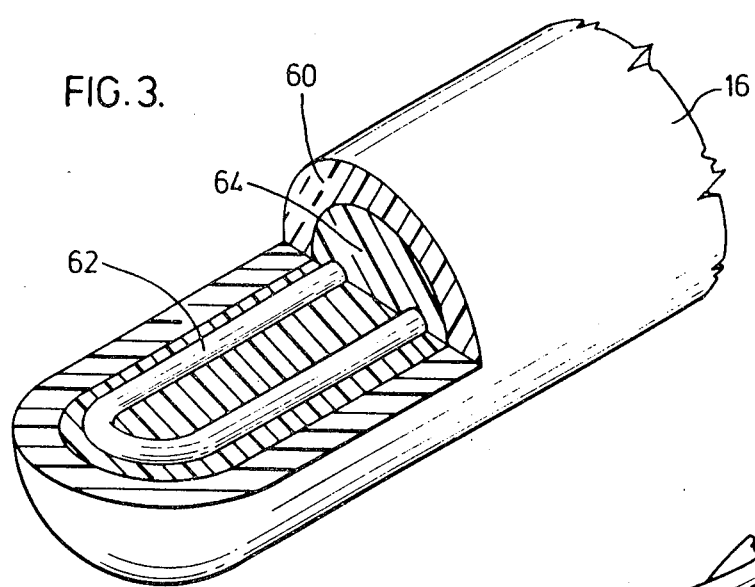
FIG. 3 is a partial sectional view of a heating element of double core construction.

The single element type heating element 16 may be of either single core or double core construction. Referring to FIG. 3, the double or 2-core heating element 16 has a flexible metal sheath 60 formed of a material such as Inconel or stainless steel. Enclosed in the sheath 60 is the resistance wire 62 formed of a material such as a nickel chromium alloy surrounded by a refractory powder electrical insulating material 64 such as compacted magnesium oxide powder. As may be seen, the resistance wire 62 extends to the end of the heating element 16 and then doubles back on itself to provide heating along the length of the heating element 16.

Figure 4:
FIG. 4 is a perspective view of a heating element of single core construction.
Figure 5:
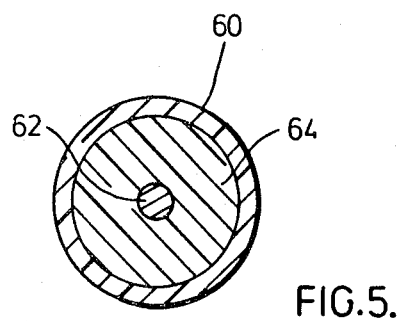
FIG. 5 is a sectional view of the heating element shown in FIG. 4.

The heating element 16 of the single core type shown in FIGS. 4 and 5 has a similar structure except that only a single resistance wire 62 is located in the insulating material 64 inside the sheath 60. However, the single element structure is provided by turning the assembled unit back upon itself and then braiding the two portions together. This has the advantage of being much more economical to manufacture.

In use, the sprue bushing is installed between the molding machine and the cavity 13 and the lead wires 36 are connected to a suitable source of power. After the sprue bushing 10 has heated up, operation commences. Melt from the machine is injected under very high pressure from the machine into the runner passage 12 and is kept in the molten state by heat from the heating element 16. After the application of each impulse of pressure from the machine to fill the cavity, the melt solidifies in the area of the restricted orifice portion 22 and at the same time there is a slight drawback of pressure from the machine which draws at least some of the melt back out of this area of the runner passage. Cooling 54 is provided to the cavity plate 44 and after the part has set, the mold opens to eject it and then closes again and the process is repeated. This provision of sufficient heat down close to the gate area and utilization of the machine drawback enables a high quality sprueless product to be molded without repeated malfunctioning of the apparatus.

Figure 2:
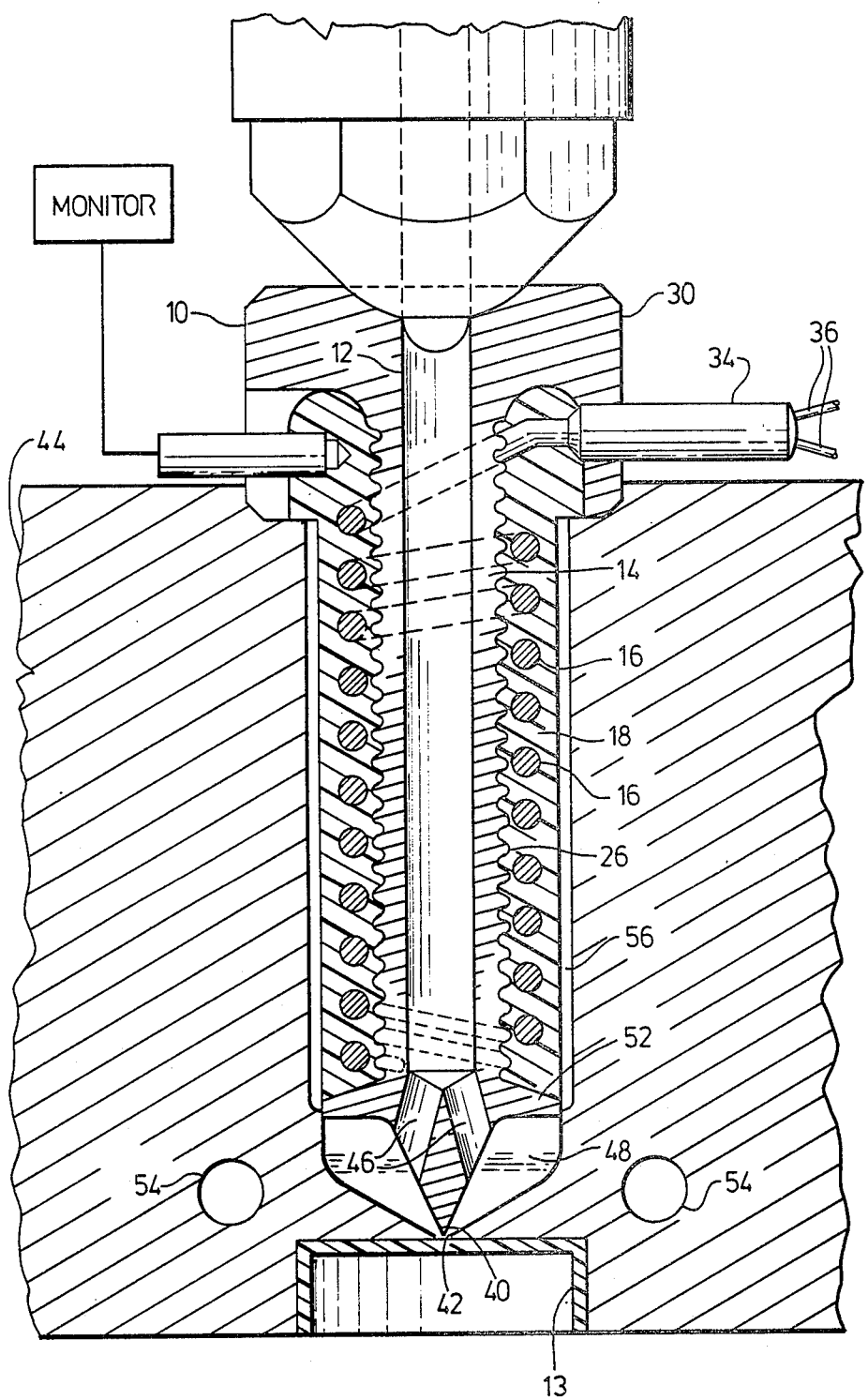
FIG. 2 is a sectional view of a sprue bushing according to a second embodiment of the invention.

Referring now to FIG. 2, it illustrates a sprue bushing 10 according to a second embodiment of the invention. As many of the features are identical to those of the first embodiment, features common to both embodiments are described and illustrated using the same reference numerals. The sprue bushing 10 according to this embodiment also has a central runner passage 12 defined by an inner core portion 14, a helical heating element 16, and an outer shell portion 18. The difference is that the inner core portion is shaped to form a pointed tip 40 which extends adjacent the gate 42 in the cavity plate 44. As may be seen, the runner passage splits into two arms 46 to convey the melt into a semicircular area 48 surrounding the tip 40, from which it flows past the tip and into the cavity 13. The inner core portion 14 also has a flanged skirt portion 52 which makes contact with the cavity plate over a minimum width of approximately 0.040 inches to locate it and seal the melt against leakage. The highly conductive outer shell portion 18 is surrounded by air gap 56 to reduce heat loss to the cavity plate 44.

The use of this embodiment of the invention, as well as the structure of the heating element 16 and helical ridge 26 are similar to that of the first embodiment and need not be described further.

Although the description of this invention has been given with respect to two particular embodiments of the sprue bushing, it is not to be construed in a limiting sense. Many variations and modifications will now occur to those skilled in the art. In particular, other shapes and configurations of ridges could be used to provide the undulating outer surface of the inner core portion of the sprue bushing. For a definition of the invention, reference is made to the appended claims.

What I claim is:

1. An integral electrically heated sprue bushing for injection molding comprising:
    (a) an elongated inner core portion defining a central runner passage extending therethrough and an inlet and a restricted orifice portion at opposite ends thereof, the core portion being formed of a high strength thermally conductive metal material and having an undulating outer surface;
    (b) an electrically insulated helical heating element having a plurality of spaced coils encircling the inner core portion and terminal means adapted to receive electrical power from an external source, the inner helical diameter of the heating element being greater than the maximum outer diameter of the undulating outer surface of the inner core portion; and
    (c) an elongated outer shell portion casted on the inner core portion and casting in the heating element to be bonded to them along their length, the outer shell portion being formed of a metal having a high thermal conductivity.

2. A sprue bushing as claimed in claim 1 wherein the outer surface of the inner core portion is corrugated.

3. A sprue bushing as claimed in claim 1 wherein the outer surface of the inner core portion defines a helical ridge having a uniform curved cross section.

4. A sprue bushing as claimed in claim 3 wherein the helical heating element and the helical ridge are threaded in opposite directions.

5. A sprue bushing as claimed in claim 1 wherein the inner core portion is formed of a beryllium nickel alloy and the outer shell portion is formed of a beryllium copper alloy.

6. A sprue bushing as claimed in claim 1 wherein the heating element comprises a resistance wire having a first portion extending from the terminal means and a second portion returning to the terminal means, the first and second portions of the wire being surrounded by insulating material and enclosed in a single conductive sheath.

7. A sprue bushing as claimed in claim 1 wherein the heating element comprises an insulated resistance wire having a first portion extending from the terminal means and a second portion returning to the terminal means, the first and second portions being twisted together to form a single element.

* * * * *